Dec. 2, 1952   W. SWIFT   2,620,031
SHEARING MACHINE
Filed Feb. 6, 1950   3 Sheets-Sheet 1

Inventor
W. Swift

Dec. 2, 1952  W. SWIFT  2,620,031
SHEARING MACHINE
Filed Feb. 6, 1950  3 Sheets-Sheet 2

Inventor
W. Swift

Dec. 2, 1952 W. SWIFT 2,620,031
SHEARING MACHINE
Filed Feb. 6, 1950 3 Sheets-Sheet 3

Inventor
W. Swift

Patented Dec. 2, 1952

2,620,031

UNITED STATES PATENT OFFICE 2,620,031

SHEARING MACHINE

William Swift, Sutton Coldfield, England, assignor to Joseph Lucas Limited, Birmingham, England Application February 6, 1950, Serial No. 142,544
In Great Britain February 9, 1949

5 Claims. (Cl. 164—47)

This invention has for its object to provide a shearing machine for trimming the ends of the wires after a winding operation on a dynamo or electric motor armature, or for trimming one or each end of a drawn or pressed metal article, or for any other analogous use involving a shearing action.

In the accompanying sheets of explanatory drawings.

Figure 1:
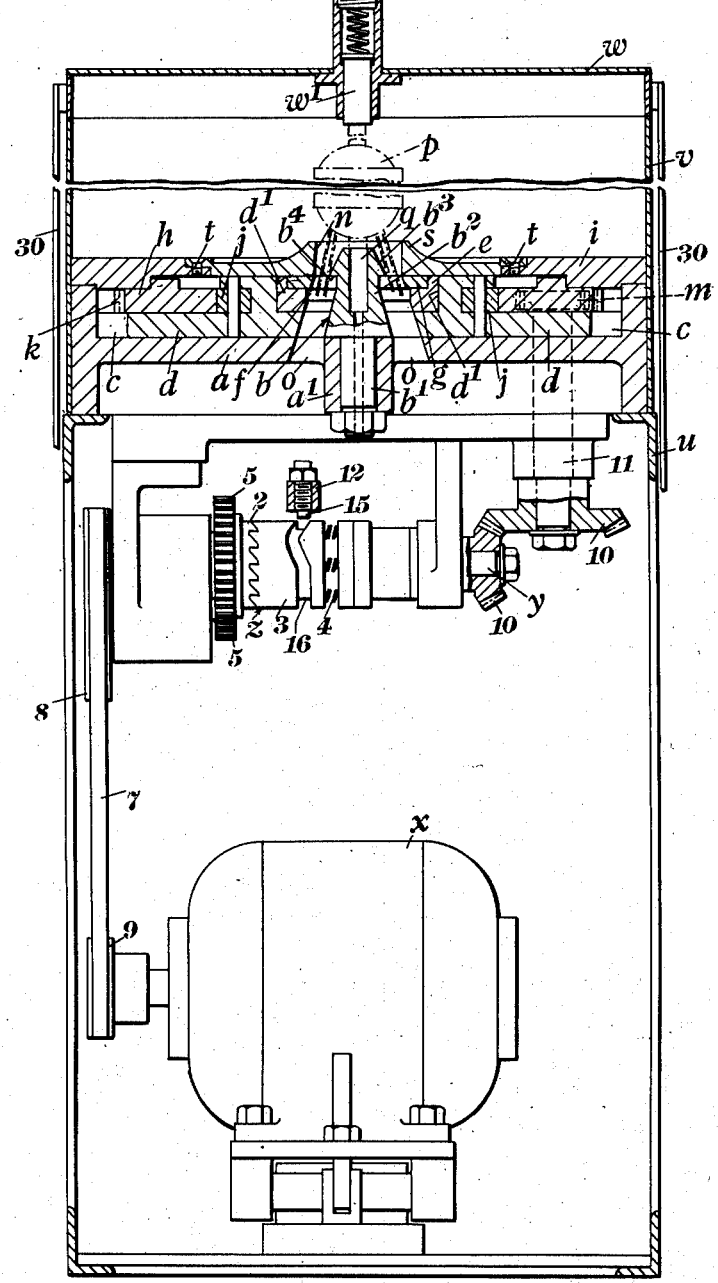
Figure 1 is a sectional side view of a shearing machine in accordance with the invention.
Figure 2:
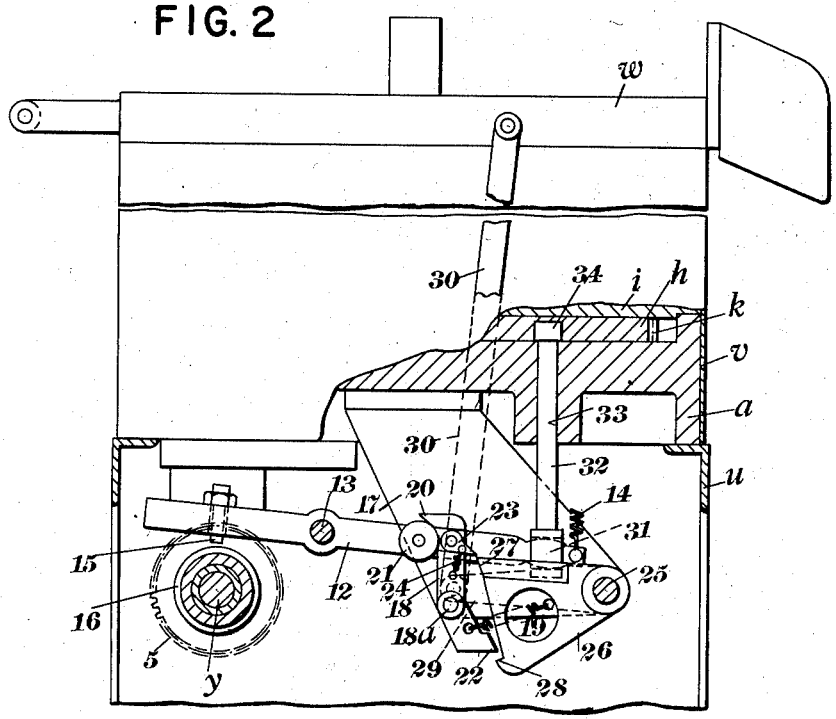
Figure 2 is a fragmentary part sectional side view taken at right angles to Figure 1.
Figure 3:
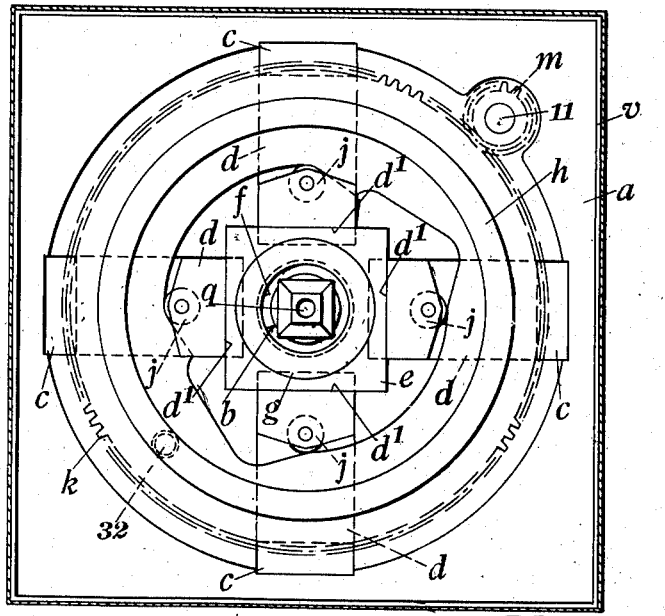
Figure 3 is a sectional plan with a cover piece removed.

In carrying the invention into effect as shown, there is employed a horizontal bed $a$ adapted to support a stationary tool $b$. The latter may comprise a shank $b^1$ which occupies a socket $a^1$ in the bed, an intermediate portion $b^2$ extending upwardly from the shank, and a head $b^3$ of truncated pyramidal form and of square cross section on the upper end of the intermediate portion, the base portion of the head being arranged to overhang the intermediate part of the tool and provide four straight cutting edges $b^4$.

In guide channels as $c$ on the bed $a$ and around the region occupied by the stationary tool $b$, are arranged two pairs of slides $d$. The slides in each pair are in relative alignment, and the two pairs of slides are mutually at right angles. At their adjacent ends the slides $d$ are shouldered at $d^1$ to carry between them a member $e$ which externally is of square shape and which is formed with a central hole $f$, the upper surface of this member being recessed to accommodate an annular cutting tool $g$, the upper surface of which is adapted to slide beneath and cooperate with the overhanging cutting edges $b^4$ of the stationary tool $b$.

Above and in contact with the upper surfaces of the slides $d$ there is rotatably mounted an annular cam $h$ which is held in position by a cover piece $i$ secured to the bed $a$, and the inner periphery of the cam is suitably shaped to impart reciprocatory movements in the manner hereinafter described to the slides $d$, through the medium of rollers $j$ carried by the slides, when the cam is rotated. The external periphery of the annular cam $h$ is formed with gear teeth $k$ which engage an actuating pinion $m$, the latter being driven through any convenient gearing from an electric motor or other source of motion.

In the cover piece $i$ is formed an aperture $n$ giving access to the tools $b$, $g$, and in the bed $a$ at a position around the stationary tool $b$ are formed apertures $o$ through which severed scrap pieces hereinafter referred to can fall away from the tools.

When the machine above described is required for trimming the free ends of the wires extending from one end of an armature $p$ of a dynamo or electric motor after a winding operation wherein the wires have been wound on the armature, the upper end of the stationary tool $b$ is formed with an axial socket $q$ for supporting one end of the armature spindle, and the upper surface of the cover piece $i$ may be formed around the aperture $n$ with a raised boss $s$ having a sloping outer periphery for guiding the ends of any of the wires not required to be trimmed away from the cutting region between the tools $b$, $g$. In some winding operations, hooked ends are left on some of the wires, and these ends are required to be trimmed, the ends of the other wires being plain and of the desired length. In this case the operative splays the plain ends outwardly prior to the armature being placed in position, so that these ends can be deflected by the boss $s$, across the top of the cover piece $i$, and only the hooked ends pass into the cutting region. If desired the portion of the cover piece $i$ formed with the aperture $n$ and boss $s$ may be made separately from the remainder of the cover piece and secured thereto by screws $t$.

The mode of action of the machine so far described is as follows:

After an armature as $p$ has been mounted in position, the machine is set in motion. The first effect of the cam $h$ is to move one pair of slides $d$ so as to advance a part of the annular tool $g$ beneath one of the straight edges $b^4$ of the stationary tool $b$, so severing the adjacent wire or wires. During the opposite movement of these slides by the cam the opposite part of the annular tool $g$ is moved under the opposite straight edge of the stationary tool $b$, thereby causing another wire or wires to be cut. In this phase the other pair of slides $d$ are stationary and serve as guides for the rectangular member $e$ carrying the annular cutting tool $g$. In the next phase the slides $d$ which have already been actuated are held stationary, and the other pair are then actuated by the cam $h$ in like manner to the first mentioned pair for severing the remaining ends of the wires to be cut, the first mentioned slides now serving in this phase as guides for the rectangular member e. The severed scrap pieces of wire fall through the aperture o in the bed a.

In a preferred form of the machine above described, the bed a is mounted on a fixed frame u, and is enclosed by a casing v having its upper end closed by a hinged cover w. The latter carries a spring loaded plunger $w^1$ adapted to bear on the adjacent end of the spindle of the armature p.

Within the fixed frame u is mounted an electric motor x, and a horizontal shaft y adapted to be rotated by the motor under the control of a dog-clutch z. This clutch comprises a toothed driving member 2 rotatably mounted on the shaft y, and a complementary toothed driven member 3 slidably keyed to the shaft, the driven member being loaded by springs 4 which tend to move this member into engagement with the driving member. The latter is connected by interengaging toothed wheels 5 to a spindle 6 which in turn is connected to the spindle of the electric motor x by a belt 7 passing around pulleys 8, 9. The shaft y is connected by level gearing 10 to a spindle 11 carrying the above mentioned pinion m which engages the gear teeth k on the annular cam h.

Also mounted within the fixed frame u is a lever 12 for controlling the clutch z. This lever is pivotally supported at a position between its ends by a fixed pivot 13, and is loaded at one end by a spring 14. Near its other end the clutch-control lever 12 carries a peg 15, and the driven clutch member 3 is formed with a circumferential cam groove 16 with which the peg can co-operate for disengaging the clutch.

On a fixed bracket 17 depending from the underside of the bed a is pivotally mounted a double-armed lever 18 which is loaded by a spring 19, the pivot of this lever being indicated by $18^a$. One end of the lever 18 is formed with a laterally projecting beak 20 adapted to act on a roller 21 carried by the clutch-control lever 12 at a position between the axis of this lever at its loading spring 14. The other end of the lever 18 is formed with a lateral projection 22 which extends in the opposite direction to the beak 20, and on this lever is pivotally mounted a laterally projecting pivotal pawl 23 which is situated adjacent to the beak but extends in the same direction as the projection 22, the pawl being loaded by a spring 24.

Also pivotally supported by the bracket 17 is a spindle 25 carrying a segment 26 which extends towards the lever 18. The side of the segment 26 remote from its supporting spindle 25 is formed at one end with an acute-angled nose 27 adapted to act on the pawl 23, and at the other end with a shoulder 28 adapted to co-operate with the lateral projection 22 on the lever 18. Secured on the pivot spindle 25 carrying the segment 26 are levers as 29 which are connected by links 30 to the hinged cover w of the casing v, so that movement of the cover is accompanied by movement of the segment.

The spring loaded end of the clutch control lever 12 has a universal or other pivotal connection at 31 with the lower end of a vertical stop rod 32 which extends through a hole 33 in the bed a, and which at its upper end is adapted to engage a recess 34 in the underside of the annular cam h for holding the latter against rotation.

Figure 4:
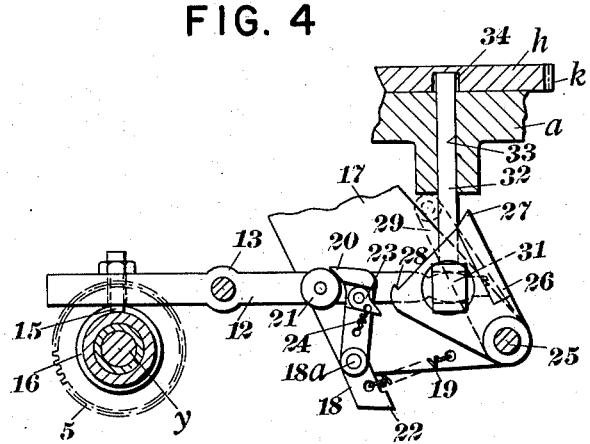
Figure 4 is a fragmentary view similar to that shown in Figure 2, but with the movable parts shown in different positions.
Figure 5:
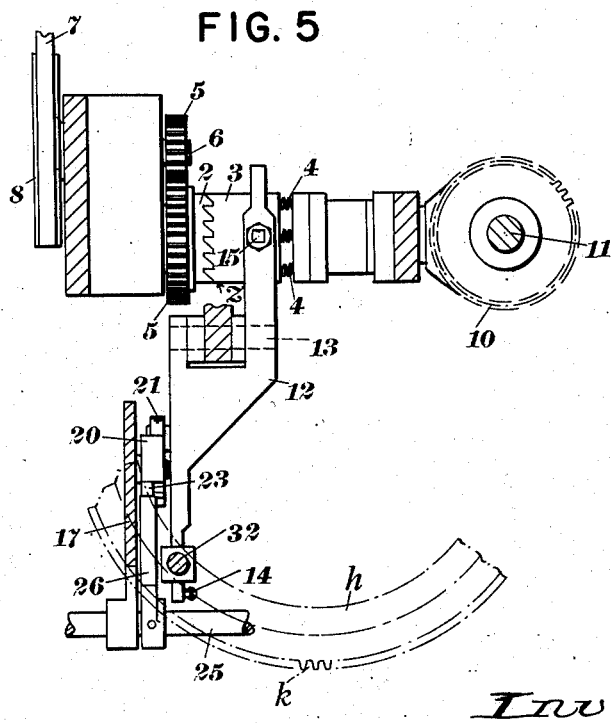
Figure 5 is a sectional plan of the controlling mechanism.

When the machine is at rest with the hinged cover w open, the peg 15 on the clutch control lever 12 engages the cam groove 16 in the driven member 3 of the clutch z (the latter being disengaged), and the upper end of the stop rod 32 engages the recess 34 in the cam h, this being the condition shown in Figure 4. Assuming now that the electric motor x is in motion, and that it is required to start the machine, all that is necessary is to close the hinged cover w. The first effect of this is to move the segment 26 downwardly. Near the end of the downward movement of the segment 26, its nose 27 serves by acting on the pawl 23 to move the lever 18 in a counter-clockwise direction, causing the beak 20 on this lever to act on the roller 21 on the clutch-control lever 12, and thereby actuate the latter to withdraw the peg 15 from the cam groove 16 in the driven clutch member 3 and allow this member to engage the driving clutch member 2 under the action of its loading springs 4. At the same time the stop rod 32 is moved by the clutch-control lever 12 out of engagement with the recess 34 in the annular cam h, allowing the latter to be rotated by the pinion m. During the ensuing revolution of the cam h, the clutch-control lever 12 is prevented from being returned to its initial position by contact of the upper end of the stop rod 32 with the underside of the cam. Also, opening of the hinged cover w is prevented by the lateral projection 22 on the lever 18 which now lies in the path of the shoulder 28 on the segment 26. However, when the recess 34 in the cam h is again brought over the upper end of the stop rod 32 at the end of a complete revolution of the cam, the upper end of the stop rod re-engages the recess in the cam, and the clutch-control lever 12 returns to its initial position under the action of its loading spring 14. During the return of the lever 12 its peg 15 enters the cam groove 16 and causes the clutch z to be disengaged. Also the interaction of the roller 21 on the clutch-control lever 12 with the beak 20 on the lever 18 during the return movement of the clutch-control lever, causes the lever 18 to move its lateral projection 22 out of the path of the shoulder 28 on the segment 26, and thus enables the cover w to be opened. During the opening movement of the cover w, the beak 27 on the segment 26 moves the pawl 23 idly, and the parts re-assume the positions shown in Figure 4.

By means of the machine above described the trimming of the ends of the wires wound on an armature, in readiness for a subsequent operation in which the wire ends are connected to commutator segments, can be effected in a very expeditious manner.

The invention is not, however, restricted to the particular purpose above described, as it may be applied to other analogous operations. For example, it may be used for trimming one or each end of a hollow cylindrical metal article produced by a drawing or pressing operation, the tools being suitably modified if necessary to suit different requirements.

Having thus described my invention what I claim as new and desire to secure by Letters Patent is:

1. A shearing machine comprising in combination on a bed, a stationary shearing tool mounted on the bed and having cutting edges formed by a square-shaped ledge, a movable shearing tool of annular form surrounding the stationary tool and having an edge for cooperation with the ledge of the stationary tool, two pairs of slides arranged with the slides of each pair in relative alignment and with the two pairs of slides mutually at right angles, a rectangular member carrying the movable shearing tool and supported by the two pairs of slides, and a rotary cam arranged to act on and reciprocate the slides, the latter being formed with shoulders between which the rectangular member is arranged and which form guides for the said member, the arrangement being such that on rotation of the cam, the movable shearing tool is displaced successively relative to the stationary tool along paths disposed at right angles to each other whereby the edge of the said movable tool is moved in succession into shearing relationship with the cutting edges of the stationary tool.

2. A shearing machine as claimed in claim 1, and having in combination a casing enclosing the bed, a hinged cover closing the upper end of the casing, and means for imparting rotation to the cam under the control of the lid.

3. A shearing machine as claimed in claim 2, in which the means for imparting rotation to the cam comprise in combination gear teeth on the cam, a pinion engaging the gear teeth, a source of motion, transmission mechanism including a clutch for interconnecting the source of motion and the pinion, a spring loaded lever for controlling the clutch, and means responsive to movement of the hinged cover for actuating the lever.

4. A shearing machine as claimed in claim 3, and having pivotally connected to the lever, a stop rod adapted to engage a recess in one side of the cam.

5. A shearing machine as claimed in claim 4, in which the means for actuating the lever comprise in combination a pivotal member connected to and movable by the hinged cover, and a second lever operable by the pivotal member through the medium of a spring loaded pawl to actuate the first mentioned lever, the second lever being adapted to obstruct return movement of the pivotal member after the latter has been actuated by closing movement of the cover, and until the first lever is moved by its spring loading to disengage the clutch under the control of the stop rod.

WILLIAM SWIFT.

REFERENCES CITED

The following references are of record in the file of this patent:

UNITED STATES PATENTS

| Number | Name | Date |
|---|---|---|
| 610,213 | White | Sept. 6, 1898 |
| 1,007,103 | Heine | Oct. 31, 1911 |
| 1,717,613 | McNeil | June 18, 1929 |

FOREIGN PATENTS

| Number | Country | Date |
|---|---|---|
| 13,538 | Great Britain | June 4, 1910 |